US011994129B2

(12) United States Patent
Hebrard et al.

(10) Patent No.: US 11,994,129 B2
(45) Date of Patent: May 28, 2024

(54) SCREW COMPRESSOR FOR A UTILITY VEHICLE

(71) Applicant: KNORR-BREMSE Systeme fuer Nutzfahrzeuge GmbH, Munich (DE)

(72) Inventors: Gilles Hebrard, Munich (DE); Jean-Baptiste Marescot, Munich (DE); Joerg Mellar, Munich (DE); Thomas Weinhold, Munich (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 168 days.

(21) Appl. No.: 16/355,106

(22) Filed: Mar. 15, 2019

(65) Prior Publication Data

US 2019/0211826 A1 Jul. 11, 2019

Related U.S. Application Data

(63) Continuation of application No. PCT/EP2017/073551, filed on Sep. 19, 2017.

(30) Foreign Application Priority Data

Sep. 21, 2016 (DE) ..................... 10 2016 011 395.2

(51) Int. Cl.

| | |
|---|---|
| ***F04C 29/02*** | (2006.01) |
| ***F04C 18/16*** | (2006.01) |
| ***F04C 29/04*** | (2006.01) |

(52) U.S. Cl.

CPC ............ *F04C 29/026* (2013.01); *F04C 18/16* (2013.01); *F04C 29/02* (2013.01); *F04C 29/025* (2013.01); *F04C 29/04* (2013.01); *F04C 2240/30* (2013.01); *F04C 2240/809* (2013.01); *F04C 2270/19* (2013.01); *F04C 2270/24* (2013.01);

(Continued)

(58) Field of Classification Search

CPC ........ F04C 29/026; F04C 18/16; F04C 29/02; F04C 29/025; F04C 29/04; F04C 2240/30; F04C 2240/809; F04C 270/19; F04C 2270/24; F04C 2280/02; F05C 2251/12

USPC ............................................................ 418/88

See application file for complete search history.

(56) References Cited

U.S. PATENT DOCUMENTS 2,225,205 A * 12/1940 Brooks .................. B03C 1/286 335/305
2,983,385 A * 5/1961 Botstiber ........... F01M 11/0408 137/329.04

(Continued)

FOREIGN PATENT DOCUMENTS

| | | |
|---|---|---|
| CN | 1361359 A | 7/2002 |
| CN | 102661277 A | 9/2012 |

(Continued)

OTHER PUBLICATIONS

English Translation of DE 10-2015-205941 A1 obtained Mar. 7, 2022 (Year: 2022).*

(Continued)

*Primary Examiner* — Connor J Tremarche
(74) *Attorney, Agent, or Firm* — Crowell & Moring LLP

(57) ABSTRACT

A screw compressor for a utility vehicle has a housing, wherein, in the operationally ready and assembled state of the screw compressor, an oil sump is provided in the housing. A magnet is arranged in the oil sump.

4 Claims, 2 Drawing Sheets

(52) U.S. Cl.
CPC ...... *F04C 2280/02* (2013.01); *F05C 2251/12* (2013.01)

(56) References Cited

U.S. PATENT DOCUMENTS

| | | | | | |
|---|---|---|---|---|---|
| 3,186,549 | A * | 6/1965 | Botstiber | B01D 29/902 210/136 |
| 4,341,506 | A * | 7/1982 | Klein | F04B 41/02 418/83 |
| 4,957,517 | A * | 9/1990 | Linnert | F01N 3/037 96/384 |
| 5,702,598 | A * | 12/1997 | Lemon | B01D 35/06 210/223 |
| 6,039,550 | A | 3/2000 | Friedley et al. | |
| 8,317,484 | B2 * | 11/2012 | Liebert | F04C 28/28 417/32 |
| 2001/0016172 | A1 | 8/2001 | Fukuoka | |
| 2006/0054402 | A1 * | 3/2006 | Dorian | B03C 1/286 184/1.5 |
| 2007/0243082 | A1 * | 10/2007 | Fields | F04C 18/0215 417/349 |
| 2010/0038296 | A1 * | 2/2010 | Beer | F01M 11/0004 210/167.03 |
| 2010/0166571 | A1 * | 7/2010 | Van Den Wyngaert | F04C 18/16 417/44.2 |
| 2011/0014077 | A1 * | 1/2011 | Martens | F04C 18/16 418/84 |
| 2013/0108497 | A1 | 5/2013 | Koeck | |
| 2015/0226218 | A1 * | 8/2015 | Yonemoto | F04C 18/08 62/468 |
| 2016/0003345 | A1 * | 1/2016 | Abe | F16H 57/0402 184/6.12 |
| 2017/0173592 | A1 * | 6/2017 | Vituri | B03C 1/0332 |

FOREIGN PATENT DOCUMENTS

| | | | | |
|---|---|---|---|---|
| CN | 102966515 | A | 3/2013 | |
| CN | 103206280 | A | 7/2013 | |
| CN | 103573329 | A | 2/2014 | |
| CN | 203420850 | U | 2/2014 | |
| CN | 203783852 | U | 8/2014 | |
| CN | 205370894 | U | 7/2016 | |
| DE | 42 34 391 | B4 | 2/2004 | |
| DE | 10 2010 015 147 | A1 | 10/2011 | |
| DE | 102015205941 | A1 * | 10/2016 | F01M 11/0408 |
| GB | 654102 | A * | 6/1951 | |
| GB | 664599 | A1 * | 1/1952 | |
| GB | 812873 | A * | 5/1959 | |
| GB | 812873 | A1 * | 5/1959 | |
| JP | 61-34384 | A | 2/1986 | |
| JP | 62-129584 | A | 6/1987 | |
| JP | 3-54391 | A | 3/1991 | |
| JP | 3-115791 | A | 5/1991 | |
| JP | 7-158579 | A | 6/1995 | |
| JP | 10-141232 | A | 5/1998 | |
| JP | 4106280 | B2 | 6/2008 | |
| JP | 2011-1835 | A | 1/2011 | |
| JP | 2013-525662 | A | 6/2013 | |
| JP | 2014-148919 | A | 8/2014 | |

OTHER PUBLICATIONS

Japanese-language Office Action issued in Japanese Application No. 2019-536673 dated May 7, 2020 with English translation (eight (8) pages).

International Preliminary Report on Patentability (PCT/IB/326 & PCT/IB/373) issued in PCT Application No. PCT/EP2017/073551 dated Apr. 4, 2019, including English translation of document C2 (German-language Written Opinion (PCT/ISA/237) previously filed on Mar. 15, 2019) (eight (8) pages).

Chinese-language Office Action issued in Chinese Application No. 201780070027.X dated Jul. 22, 2020 with English translation (nine (9) pages).

International Search Report (PCT/ISA/210) issued in PCT Application No. PCT/EP2017/073551 dated Nov. 29, 2017 with English translation (six (6) pages).

German-language Written Opinion (PCT/ISA/237) issued in PCT Application No. PCT/EP2017/073551 dated Nov. 29, 2017 (seven (7) pages).

German-language Office Action issued in counterpart German Application No. 102016011395.2 dated Oct. 2, 2017 (five (5) pages).

Korean-language Office Action issued in Korean Application No. 10-2019-7010555 dated May 1, 2020 with English translation (10 pages).

Chinese-language Office Action issued in Chinese Application No. 201780070027.X dated Feb. 7, 2020 with English translation (nine pages).

Korean-language Office Action issued in Korean Application No. 10-2019-7010555 dated Nov. 24, 2020 with English translation (10 pages).

* cited by examiner

SCREW COMPRESSOR FOR A UTILITY VEHICLE

CROSS REFERENCE TO RELATED APPLICATIONS

This application is a continuation of PCT International Application No. PCT/EP2017/073551, filed Sep. 19, 2017, which claims priority under 35 U.S.C. § 119 from German Patent Application No. 10 2016 011 395.2, filed Sep. 21, 2016, the entire disclosures of which are herein expressly incorporated by reference.

BACKGROUND AND SUMMARY OF THE INVENTION

The present invention relates to a screw compressor for a utility vehicle.

Screw compressors for utility vehicles are already known from the prior art. Such screw compressors are used to provide the compressed air required for the brake system of the utility vehicle, for example.

In this context, in particular oil-filled compressors, in particular also screw compressors, are known, in the case of which it is necessary to regulate the oil temperature. This is generally realized by virtue of an external oil cooler being provided which is connected to the oil-filled compressor and to the oil circuit via a thermostat valve. Here, the oil cooler is a heat exchanger which has two mutually separate circuits, wherein the first circuit is provided for the hot liquid, that is to say the compressor oil, and the second circuit is provided for the cooling liquid. As cooling liquid, use may be made, for example, of air, water mixtures with an antifreeze, or another oil.

This oil cooler must then be connected to the compressor oil circuit by means of pipes or hoses, and the oil circuit must be safeguarded against leakage.

This external volume must furthermore be filled with oil, such that the total quantity of oil is also increased. The system inertia is thus increased. Furthermore, the oil cooler must be mechanically accommodated and fastened, either by way of brackets situated in the surroundings or by way of a separate bracket, which necessitates additional fastening means and also structural space.

Screw compressors commonly have oil filters in order to filter out any particles in the screw compressor and in order to ensure the lubrication in particular of the screws. Such an arrangement is known for example from DE 42 34 391 B4.

It would however be desirable to further simplify the construction of a screw compressor, but without reducing the operational reliability of the screw compressor.

It is therefore the object of the present invention to advantageously further develop a screw compressor for a utility vehicle of the type mentioned in the introduction, in particular such that the screw compressor can be further simplified in terms of its construction, but without reducing its operational reliability.

This object is achieved according to the invention by a screw compressor for a utility vehicle having the claimed features. Provision is made for the screw compressor for the utility vehicle to be equipped with a housing, wherein, in the operationally ready and assembled state of the screw compressor, an oil sump is provided in the housing, and wherein a magnet is arranged in the oil sump.

The invention is based on the underlying concept that, in the case of the present design, the oil is contaminated with predominantly magnetic particles, and that such particles must be filtered out by use of an oil filter. In order to prevent a blockage of an oil filter, it is expedient to use an alternative and/or additional means for capturing particles. This is realized by way of a magnet. By arranging the magnet in the oil sump, preferably at the lowest point in the oil sump, it is achieved that the number of magnetic particles in the oil is reliably reduced. The oil filter can thus be designed to be smaller, or can even be eliminated entirely.

In particular, provision may be made for the screw compressor to have no oil filter. In this way, the construction of the screw compressor is simplified, because a component is omitted and, furthermore, fewer oil lines in the housing of the screw compressor, or else external oil lines around the screw compressor, need to be provided. A wearing part of the screw compressor is also eliminated, because the oil filter would have to be exchanged after a certain service life owing to blockage. This is now no longer necessary.

Furthermore, the housing may have a housing body and a housing cover, wherein the magnet is arranged in the housing body. By means of the arrangement in the housing body, simple and reliable fastening and also installation of the magnet are made possible. Even in the event of maintenance and overhauling of the screw compressor, the magnet is thus easily accessible and can be easily cleaned or exchanged.

Installation on the housing cover is likewise possible. In particular, provision may be made for the housing to have a housing body and a housing cover, wherein the magnet is arranged in the housing cover.

Furthermore, a baffle plate is arranged in the housing, whereby, in the operationally ready and assembled state of the screw compressor, the magnet is arranged below the baffle plate in the oil. By use of the baffle plate, it is made possible, in the event of movement of the screw compressor in particular when the utility vehicle is in operation and travelling, for the mobility of the oil in the housing to be restricted, and for the effect of centrifugal forces and inertia forces to be reduced. By virtue of the fact that, in the operationally ready and assembled state of the screw compressor, the magnet is arranged below the baffle plate, it is ensured that the magnet is washed around by the oil substantially at all times and can thus perform its function as a particle catcher.

The magnet may be formed as a substantially cylindrical disc. This permits simple production, but at the same time also a relatively large surface to which particles can adhere. The magnet may however also have any other desired shape.

The magnet may be fastened in the housing by way of a spacer. It is hereby made possible for both the front side and the rear side of the magnet to be able to be washed around by the oil.

The spacer may have a screw bolt and/or a distancing element. The distancing element may, for example, be a distancing sleeve pushed onto a screw bolt. The use of screw bolts and/or of a distancing element as a spacer permits a simple and reliable fastening of the magnet while simultaneously ensuring the function that the magnet should have a certain spacing from the housing inner wall or from the housing cover inner wall in order to ensure that the magnet is washed around completely.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
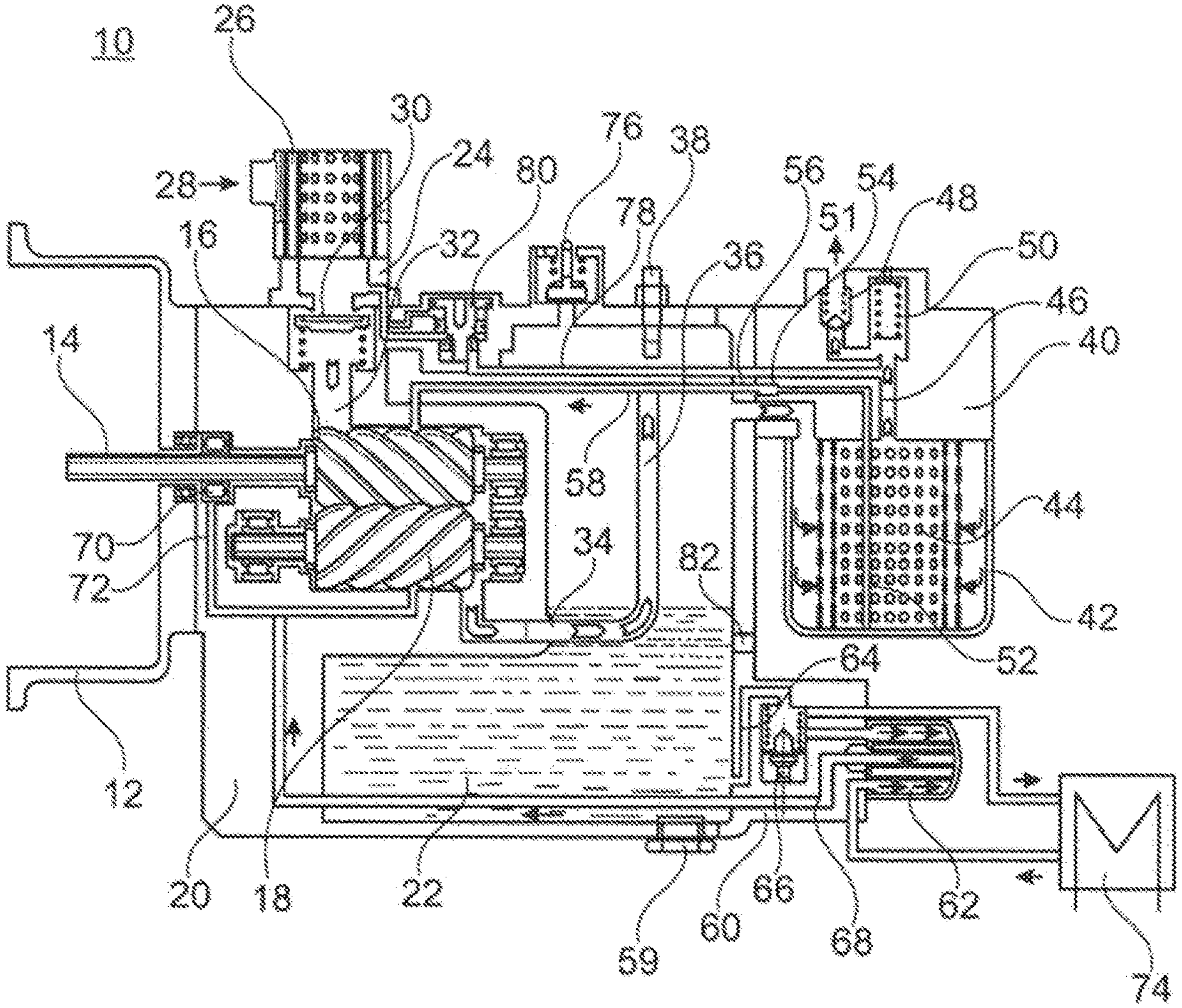
FIG. 1 is a schematic sectional drawing through an exemplary screw compressor according to the invention.

FIG. 1 shows, in a schematic sectional illustration, a screw compressor 10 in the context of an exemplary embodiment of the present invention.

The screw compressor 10 has a fastening flange 12 for the mechanical fastening of the screw compressor 10 to an electric motor (not shown in any more detail here).

What is shown, however, is the input shaft 14, by which the torque from the electric motor is transmitted to one of the two screws 16 and 18, specifically the screw 16.

The screw 18 meshes with the screw 16 and is driven by means of the latter.

The screw compressor 10 has a housing 20 in which the main components of the screw compressor 10 are accommodated.

The housing 20 is filled with oil 22.

At the air inlet side, an inlet connector 24 is provided on the housing 20 of the screw compressor 10. The inlet connector 24 is in this case designed such that an air filter 26 is arranged at the inlet connector. Furthermore, an air inlet 28 is provided radially on the air inlet connector 24.

In the region between the inlet connector 24 and the point at which the inlet connector 24 joins to the housing 20, there is provided a spring-loaded valve insert 30, which is designed here as an axial seal.

The valve insert 30 serves as a check valve.

Downstream of the valve insert 30, an air feed channel 32 is provided which feeds the air to the two screws 16, 18.

At the outlet side of the two screws 16, 18, an air outlet pipe 34 with a riser line 36 is provided.

In the region of the end of the riser line 36, a temperature sensor 38 is provided by which the oil temperature can be monitored.

Also provided in the air outlet region is a holder 40 for an air deoiling element 42.

In the assembled state, the holder 40 for the air deoiling element has the air deoiling element 42 in the region facing toward the base (as also shown in FIG. 1).

Also provided, in the interior of the air deoiling element 42, is a corresponding filter screen or known filter and oil separating devices 44, which will not be specified in any more detail.

In the central upper region in relation to the assembled and operationally ready state (that is to say as shown in FIG. 1), the holder 40 for the air deoiling element 42 has an air outlet opening 46 which leads to a check valve 48 and a minimum pressure valve 50. The check valve 48 and the minimum pressure valve 50 may also be formed in one common combined valve.

The air outlet 51 is provided downstream of the check valve 48.

The air outlet 51 is generally connected to correspondingly known compressed-air consumers.

In order for the oil 22 that is situated and separated off in the air deoiling element 42 to be returned again into the housing 20, a riser line 52 is provided which has a filter and check valve 54 at the outlet of the holder 40 for the air deoiling element 42 at the transition into the housing 20.

A nozzle 56 is provided, downstream of the filter and check valve 54, in a housing bore. The oil return line 58 leads back into approximately the central region of the screw 16 or of the screw 18 in order to feed oil 22 thereto again.

An oil drain screw 59 is provided in the base region, in the assembled state, of the housing 20. By way of the oil drain screw 59, a corresponding oil outflow opening can be opened, via which the oil 22 can be drained.

Also provided in the lower region of the housing 20 is the attachment piece 60 to which the oil filter 62 is fastened. Via an oil filter inlet channel 64, which is arranged in the housing 20, the oil 22 is conducted firstly to a thermostat valve 66.

Instead of the thermostat valve 66, it is possible for an open-loop and/or closed-loop control device to be provided by which the oil temperature of the oil 22 situated in the housing 20 can be monitored and set to a setpoint value.

Located downstream of the thermostat valve 66 is the oil inlet of the oil filter 62, which, via a central return line 68, conducts the oil 22 back to the screw 18 or to the screw 16 again, and also to the oil-lubricated bearing 70 of the shaft 14. Also provided in the region of the bearing 70 is a nozzle 72, which is provided in the housing 20 in conjunction with the return line 68.

The cooler 74 is connected to the attachment piece 60.

In the upper region of the housing 20 (in relation to the assembled state), a safety valve 76 is located, by which an excessively high pressure in the housing 20 can be dissipated.

Upstream of the minimum pressure valve 50, a bypass line 78 is located, which leads to a relief valve 80. Via said relief valve 80, which is activated by means of a connection to the air feed 32, air can be returned into the region of the air inlet 28. In this region, there may be provided a ventilation valve (not shown in any more detail) and also a nozzle (diameter constriction of the feeding line).

Furthermore, approximately at the level of the line 34, an oil level sensor 82 may be provided in the outer wall of the housing 20. The oil level sensor 82 may for example be an optical sensor, and may be designed and configured such that, on the basis of the sensor signal, it can be identified whether the oil level during operation is above the oil level sensor 82 or whether the oil level sensor 82 is exposed, and thus the oil level has correspondingly fallen.

In conjunction with this monitoring, it is also possible for an alarm unit to be provided which outputs or transmits a corresponding error message or warning message to the user of the system.

The function of the screw compressor 10 shown in FIG. 1 is as follows.

Air is fed via the air inlet 28 and passes via the check valve 30 to the screws 16, 18, where the air is compressed. The compressed air-oil mixture, which, having been compressed by a factor of between 5 and 16 downstream of the screws 16 and 18, rises through the outlet line 34 via the riser pipe 36, and is blown directly onto the temperature sensor 38.

The air, which still partially carries oil particles, is then conducted via the holder 40 into the air deoiling element 42 and, if the corresponding minimum pressure is attained, passes into the air outlet line 51.

The oil 22 situated in the housing 20 is kept at operating temperature via the oil filter 62 and possibly via the heat exchanger 74.

If no cooling is necessary, the heat exchanger 74 is not used and is also not activated.

The corresponding activation is performed by way of the thermostat valve 66. After purification in the oil filter 64, oil is fed via the line 68 to the screw 18 or to the screw 16, and also to the bearing 70. The screw 16 or the screw 18 is supplied with oil 22 via the return line 52, 58, and the purification of the oil 22 takes place here in the air deoiling element 42.

By way of the electric motor (not shown in any more detail), which transmits its torque via the shaft 14 to the screw 16, which in turn meshes with the screw 18, the screws 16 and 18 of the screw compressor 10 are driven.

By way of the relief valve 80 (not shown in any more detail), it is ensured that the high pressure that prevails for example at the outlet side of the screws 16, 18 in the operational state cannot be enclosed in the region of the feed line 32, and that, instead, in particular during the start-up of the compressor, there is always a low inlet pressure, in particular atmospheric pressure, prevailing in the region of the feed line 32. Otherwise, upon a start-up of the compressor, a very high pressure would initially be generated at the outlet side of the screws 16 and 18, which would overload the drive motor.

Figure 2:
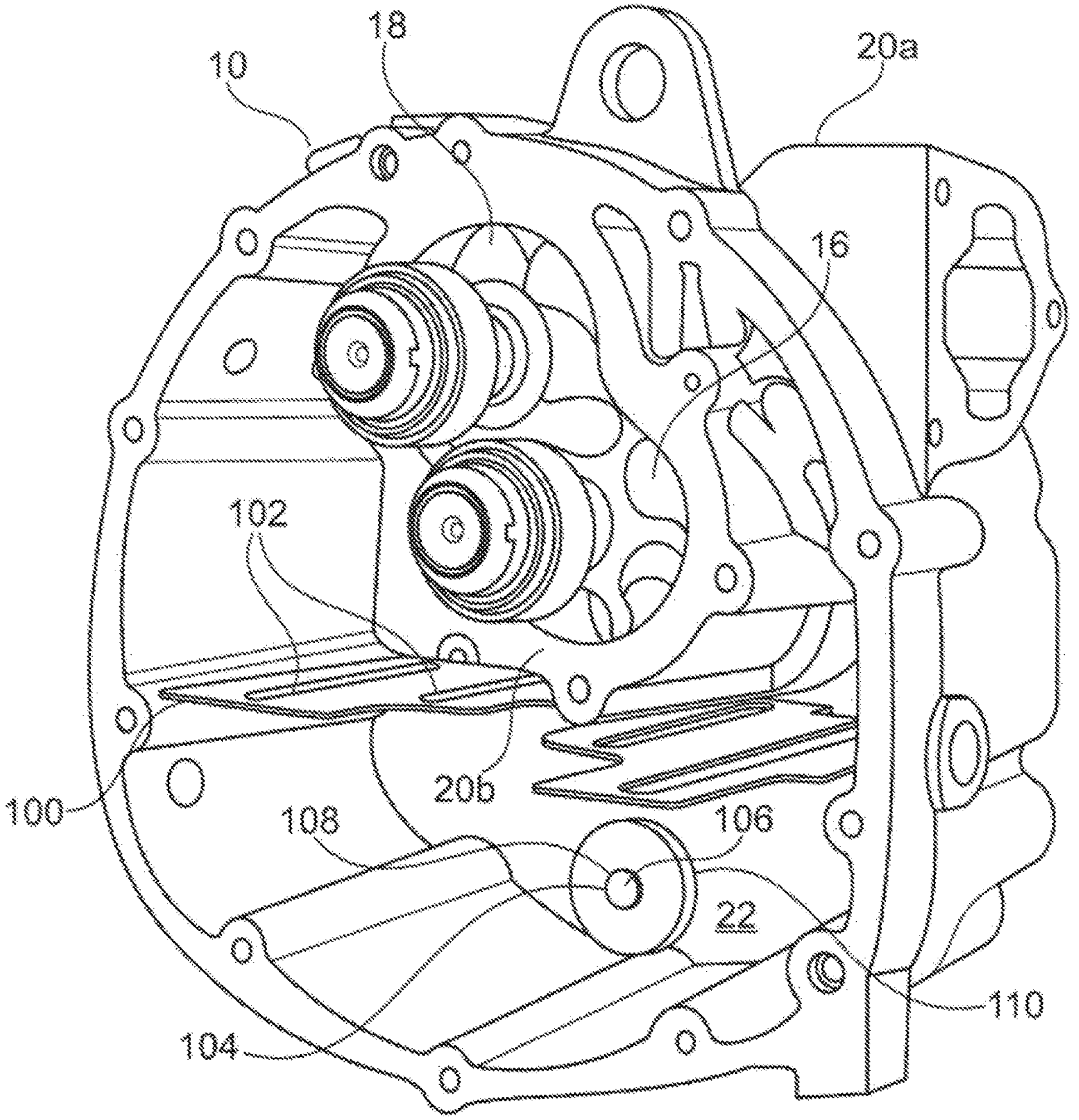
FIG. 2 is a perspective detail view of the housing cover of the screw compressor.

FIG. 2 shows, in a perspective view, a part of the screw compressor 10, specifically the housing body 20*a* of the housing 20.

As can be seen from FIG. 2, a corresponding receptacle, the rotor housing 20*b*, for the two screws 16 and 18 is provided in the housing body 20*a*.

Furthermore, in the assembled and operationally ready state (FIG. 2 shows the corresponding orientation of the housing body 20*a*), a baffle plate 100 with oil passage slots 102 is provided below the rotor housing 20*b*.

In the assembled and operationally ready state, the oil sump of the oil 22 is located below the baffle plate 100. At the substantially lowest point of the housing 20, in the oil sump of the oil 22 in the operationally ready and assembled state, there is provided a magnet 104.

The magnet 104 is fastened by use of a spacer 106, which is composed in this case of a screw bolt 108 and of a distancing sleeve 110 (not shown in any more detail), to the housing body 20*a*.

In the exemplary embodiment shown in FIG. 2, the screw compressor 10 has no oil filter 62. The latter is eliminated and is replaced entirely by the magnet 104.

The magnet 104 is formed as a substantially cylindrical disc.

The oil 22 washes completely around the magnet 104 with the exception of the small region facing toward the housing body 20*a* at which the spacer 106 passes through the magnet 104.

The housing cover of the screw compressor 10 is not shown in FIG. 2.

The function of the magnet 104 can be described as follows.

The magnetic particles floating in the oil 22, which magnetic particles pass into the oil 22 for example as a result of wear of the intermeshing screws 16 and 18, of the bearings or of other moving parts of the screw compressor 10, are filtered out of the oil 22 and attracted by the magnet 104, which acts in this case as a particle catcher.

The magnet 104 thus acts as a particle catcher and hereby purifies the oil 22.

All the particles that could thus damage the intermeshing screws 16, 18, for example, are thus filtered out by the magnet 104.

The oil filter 62 can thus be omitted, because it is now no longer necessary to perform further filtering of the oil 22.

LIST OF REFERENCE DESIGNATIONS

10 Screw compressor
12 Fastening flange
14 Input shaft
16 Screws
18 Screws
20 Housing
22 Oil
24 Inlet connector
26 Air filter
28 Air inlet
30 Valve insert
32 Air feed channel
34 Air outlet pipe
36 Riser line
38 Temperature sensor
40 Holder for an air deoiling element
42 Air deoiling element
44 Filter screen or known filter or oil separation devices
46 Air outlet opening
48 Check valve
50 Minimum pressure valve
51 Air outlet
52 Riser line
54 Filter and check valve
56 Nozzle
58 Oil return line
59 Oil drain screw
60 Attachment piece
60*a* Outer ring
60*b* Inner ring
62 Oil filter
64 Oil filter inlet channel
66 Thermostat valve
68 Return line
70 Bearing
72 Nozzle
74 Cooler, heat exchanger
76 Safety valve
78 Bypass line
80 Relief valve
82 Oil level sensor
100 Baffle plate
102 Oil passage slots
104 Magnet
106 Spacer
108 Screw bolt
110 Distancing sleeve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A screw compressor for a utility vehicle, comprising:
a housing having a housing body and a rotor housing disposed in the housing body for screws of the screw compressor, wherein, in an operationally ready and assembled state of the screw compressor, an oil sump is provided in the housing body, a baffle plate is arranged in the housing body below the rotor housing, and a magnet formed as a substantially cylindrical disc is arranged in the oil sump below the baffle plate,
an air inlet for feeding air to be compressed to an air filter,
an air feed channel for receiving filtered air from the air filter and supplying the filtered air to screws of the screw compressor, a valve insert disposed in the air feed channel to regulate supply of the filtered air to said screws, and a drain plug removably coupled to the housing, wherein the drain plug is movable from a closed position to an open position, wherein an oil outflow opening is closed when the drain plug is in the closed position and wherein the oil outflow opening is opened when the drain plug is in the open position, wherein the magnet is fastened to the housing by a spacer passing through the magnet, the spacer being composed of a screw bolt and a distancing sleeve pushed onto the screw bolt, and wherein the magnet is arranged in the housing body and is spaced away from an inner wall of the housing body so as to permit oil to wash completely around the magnet except for a region of the magnet at which the spacer passes through the magnet, wherein the magnet is spaced apart from, and not connected to, the drain plug and/or the oil outflow opening, and wherein the magnet is maintained in the housing body when the drain plug is moved to the open position.

2. The screw compressor as claimed in claim 1, wherein the screw compressor has no oil filter.

3. The screw compressor as claimed in claim 1, wherein the baffle plate extends in a horizontal direction and is provided with oil passage slots.

4. The screw compressor as claimed in claim 1, wherein the drain plug is removably coupled to a bottom wall of the housing, and wherein the magnet is coupled to a side wall of the housing.

* * * * *